(12) United States Patent
Thoreau et al.

(10) Patent No.: US 10,785,502 B2
(45) Date of Patent: Sep. 22, 2020

(54) METHOD AND APPARATUS FOR ENCODING AND DECODING A LIGHT FIELD BASED IMAGE, AND CORRESPONDING COMPUTER PROGRAM PRODUCT

(71) Applicant: INTERDIGITAL VC HOLDINGS, INC., Wilmington, DE (US)

(72) Inventors: Dominique Thoreau, Cesson Sévigné (FR); Martin Alain, Rennes (FR); Mehmet Turkan, Rennes (FR); Philippe Guillotel, Vern sur Seiche (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 281 days.

(21) Appl. No.: 15/759,564

(22) PCT Filed: Sep. 14, 2016

(86) PCT No.: PCT/EP2016/071717
§ 371 (c)(1),
(2) Date: Mar. 13, 2018

(87) PCT Pub. No.: WO2017/046176
PCT Pub. Date: Mar. 23, 2017

(65) Prior Publication Data
US 2019/0158877 A1 May 23, 2019

(30) Foreign Application Priority Data
Sep. 14, 2015 (EP) .................................... 15306409

(51) Int. Cl.
*H04N 19/597* (2014.01)
*H04N 19/172* (2014.01)
(Continued)

(52) U.S. Cl.
CPC ......... *H04N 19/597* (2014.11); *H04N 19/103* (2014.11); *H04N 19/15* (2014.11);
(Continued)

(58) Field of Classification Search
CPC .... H04N 19/597; H04N 19/103; H04N 19/15; H04N 19/577; H04N 19/80; H04N 19/182; H04N 19/172
(Continued)

(56) References Cited

U.S. PATENT DOCUMENTS 5,703,961 A * 12/1997 Rogina .................. G06K 9/209
382/154
6,097,394 A 8/2000 Levoy et al.
(Continued)

FOREIGN PATENT DOCUMENTS

WO   WO2010102935   9/2010

OTHER PUBLICATIONS

Goldluecke, Bastian, and Sven Wanner. "The Variational Structure of Disparity and Regularization of 4D Light Fields." 2013 IEEE Conference on Computer Vision and Pattern Recognition. IEEE, 2013. (Year: 2013).*
(Continued)

*Primary Examiner* — Geoffrey E Summers
(74) *Attorney, Agent, or Firm* — Robert D. Shedd

(57) ABSTRACT

The present disclosure generally relates to a method for predicting at least one block of pixels of a view (170) belonging to a matrix of views (17) obtained from light-field data belong with a scene. According to present disclosure, the method is implemented by a processor and comprises for at least one pixel to predict of said block of pixels: —from said matrix of views (17), obtaining (51) at least one epipolar plane image (EPI) belong with said pixel to predict, —among a set of unidirectional prediction modes, deter-
(Continued)

directions d

Mode 0
vertical

Mode 1
horizontal

Mode 3
diagonal down-left

Mode 4
diagonal
down-right

Mode 5
vertical right

Mode 6
horizontal
down-right

Mode 7
vertical left

Mode 8
horizontal
down-left mining (52) at least one optimal unidirectional prediction mode from a set of previous reconstructed pixels neighboring said pixel to predict in said at least one epipolar plane image, —extrapolating (53) a prediction value of said pixel to predict by using said at least one optimal unidirectional prediction mode.

19 Claims, 6 Drawing Sheets

(51) Int. Cl.
| | |
|---|---|
| H04N 19/103 | (2014.01) |
| H04N 19/577 | (2014.01) |
| H04N 19/15 | (2014.01) |
| H04N 19/182 | (2014.01) |
| H04N 19/80 | (2014.01) |

(52) U.S. Cl.
CPC ......... *H04N 19/172* (2014.11); *H04N 19/182* (2014.11); *H04N 19/577* (2014.11); *H04N 19/80* (2014.11)

(58) Field of Classification Search
USPC .......................................................... 382/238
See application file for complete search history.

(56) References Cited

U.S. PATENT DOCUMENTS

| | | |
|---|---|---|
| 7,822,280 B2 | 10/2010 | Cai et al. |
| 8,385,628 B2 | 2/2013 | Shimizu et al. |
| 2013/0058584 A1 | 3/2013 | Shimizu et al. |
| 2013/0222633 A1 | 8/2013 | Knight et al. |
| 2014/0232822 A1 | 8/2014 | Venkataraman et al. |
| 2016/0212443 A1* | 7/2016 | Liang ................... H04N 19/176 |

OTHER PUBLICATIONS

Richardson, Iain E. The H. 264 advanced video compression standard. 2nd ed., John Wiley & Sons, 2010. (Year: 2010).*

Li, Yun, et al. "Efficient intra prediction scheme for light field image compression." 2014 IEEE International conference on acoustics, speech and signal processing (ICASSP). IEEE, 2014. (Year: 2014).*

Magnor, Marcus, and Bernd Girod. "Data compression for light-field rendering." IEEE Transactions on Circuits and Systems for Video Technology 10.3 (2000): 338-343. (Year: 2000).*

Pan, Ling-Jiao, Seung-Hwan Kim, and Yo-Sung Ho. "Fast mode decision algorithms for inter/intra prediction in H. 264 Video Coding." Pacific-Rim Conference on Multimedia. Springer, Berlin, Heidelberg, 2007. (Year: 2007).*

Ramanathan, Prashant. Compression and interactive streaming of light fields. Diss. Stanford University, 2005. (Year: 2005).*

Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.

Uliyar et al., "Fast EPI Based Depth for Plenoptic Cameras", 2013 20th IEEE International Conference on Image Processing (ICIP), Melbourne, Australia, Sep. 15, 2013, pp. 1-4.

Kim et al., "Scene Reconstruction from High Spatio-Angular Resolution Light Fields", ACM Transactions on Graphics (TOG), vol. 32, No. 4, Jul. 2013, pp. 1-11.

Wanner et al., "Variational Light Field Analysis for Disparity Estimation and Super-Resolution", IEEE Transactions on Pattern Analysis and Machine Intelligence, vol. 36, No. 3, Mar. 2014, pp. 606-619.

Ng et al., "Light Field Photography with a Hand-held Plenoptic Camera", Stanford University Computer Science Technical Report, CSTR 2005-02, Apr. 2005, pp. 1-11.

Sabater et al., "Light-Field Demultiplexing and Disparity Estimation", https://hal.archives-ouvertes.fr/hal-00925652/, HAL Id: Hal-00925652, Apr. 8, 014, pp. 1-9.

Anonymous, "Depth for Augmented and Mixed Reality", 2015, http://www.pelicanimaging.com/technology/camera.html, pp. 1-2.

Goldluecke et al., "The Variational Structure of Disparity and Regularization of 4D Light Fields", 2013 IEEE Conference on Computer Vision and Pattern Recognition (CVPR), Portland, Oregon, USA, Jun. 23, 2013, pp. 1003-1010.

Wiegand et al., "Lagrange Multiplier Selection in Hybrid Video Coder Control", IEEE International Conference on Image processing 2001, Thessaloniki, Greece, Oct. 7, 2001, pp. 542-545.

Bolles et al., "Epipolar-Plane Image Analysis: An Approach to Determining Structure from Motion", International Journal of Computer Vision, vol. 1, Jan. 1987, pp. 7-55.

Shum et al., "Survey of Image-Based Representations and Compression Techniques", IEEE Transactions on Circuits and Systems for Video Technology, vol. 13, No. 11, Nov. 2003, pp. 1020-1037.

Yang et al., "Fast Intra Mode Selection for Stereo Video Coding Using Epipolar Constraint", 2011 IEEE Visual Communications and Image Processing (VCIP), Tainan, Taiwan, Nov. 6, 2011, pp. 1-4.

Zhong et al., "An Automatic Mode Decision Method for Intra Frame Coding and Decoding", International Organisation for Standardization, ISO/IEC JTC1/SC29/WG11, Coding of Moving Pictures and Audio, Document MPEG2001/M7719, Pattaya, Thailand, Dec. 2001, pp. 1-9.

Georgiev, T., "Historical Light Field", http://www.tgeorgiev.net/, Jan. 2016, pp. 1-7.

* cited by examiner

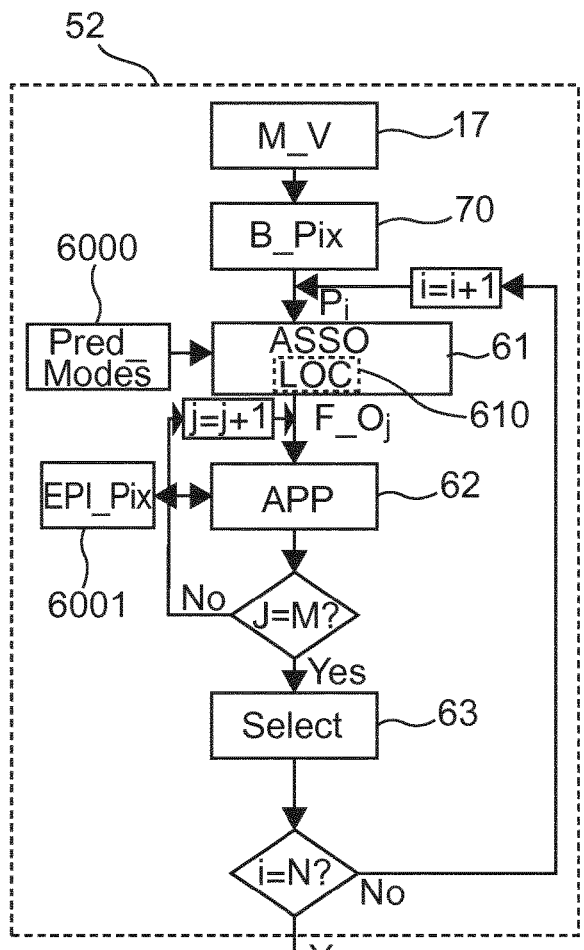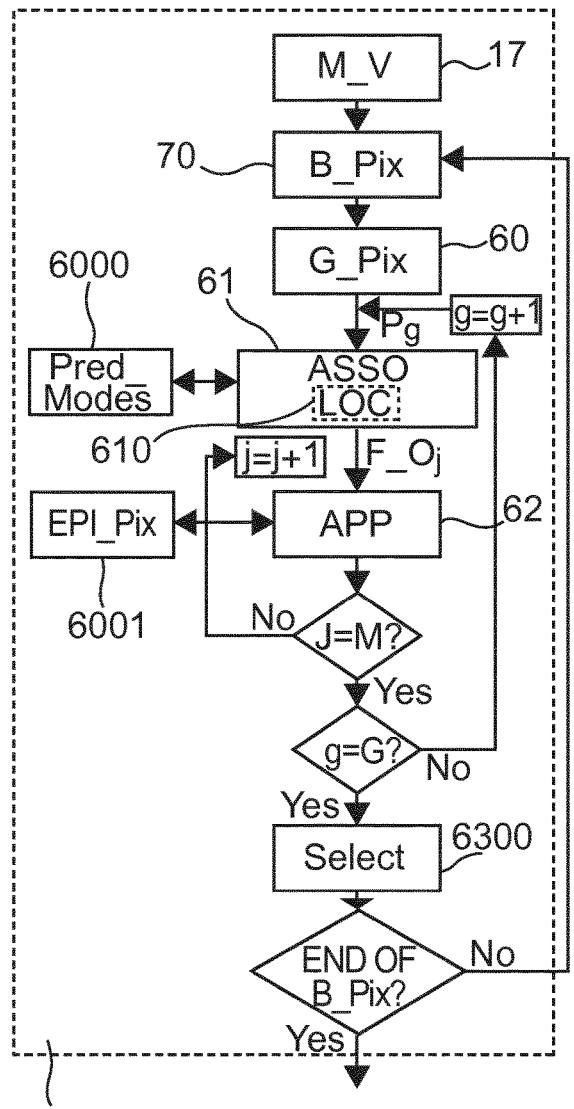
Fig. 6a
Fig. 6b

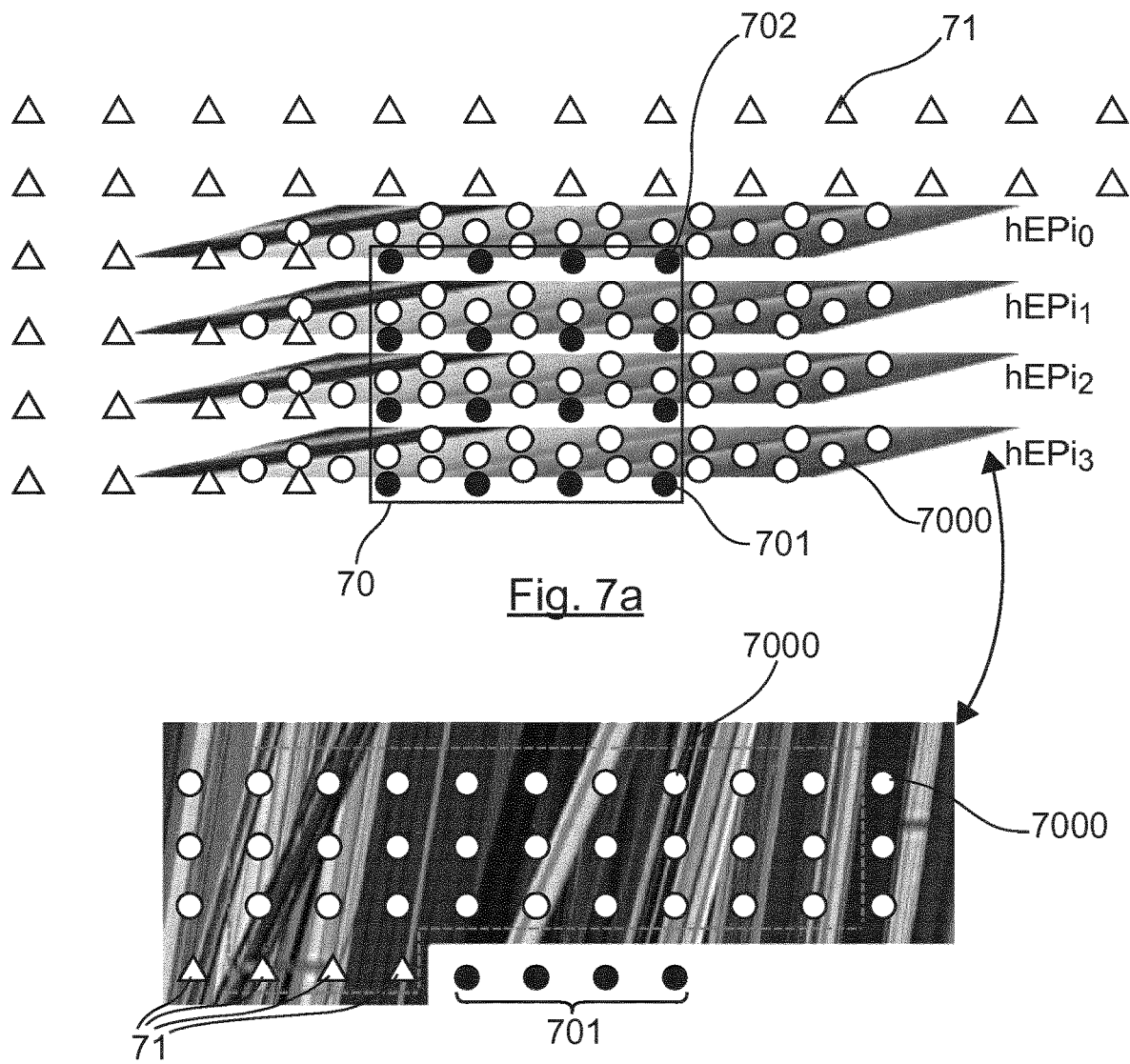
Fig. 7a
Fig. 7b
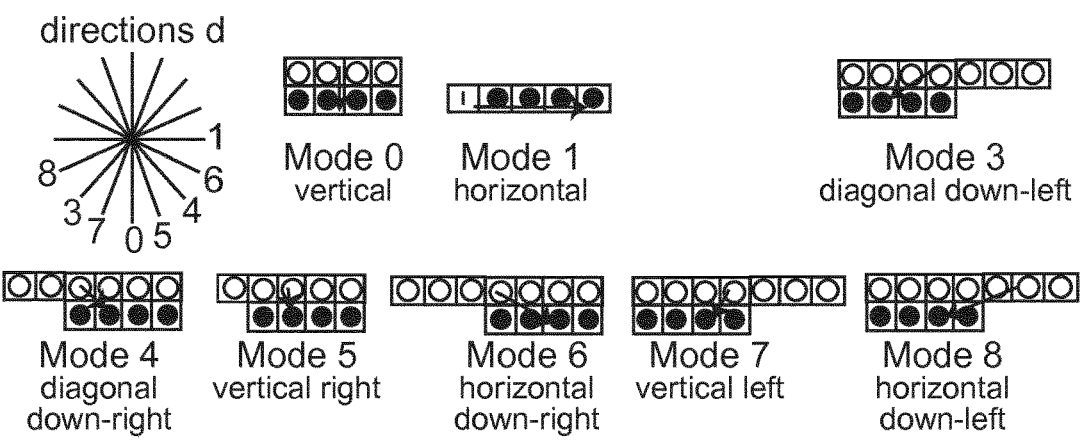
Fig. 8

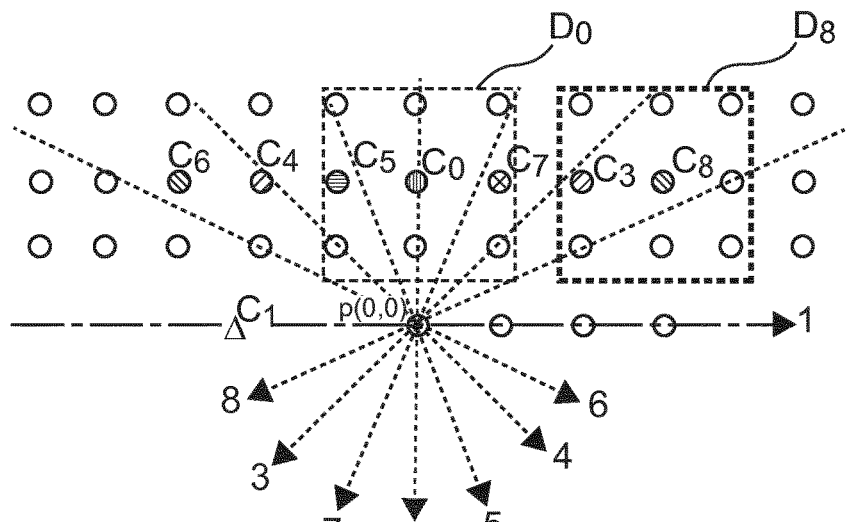
Fig. 9
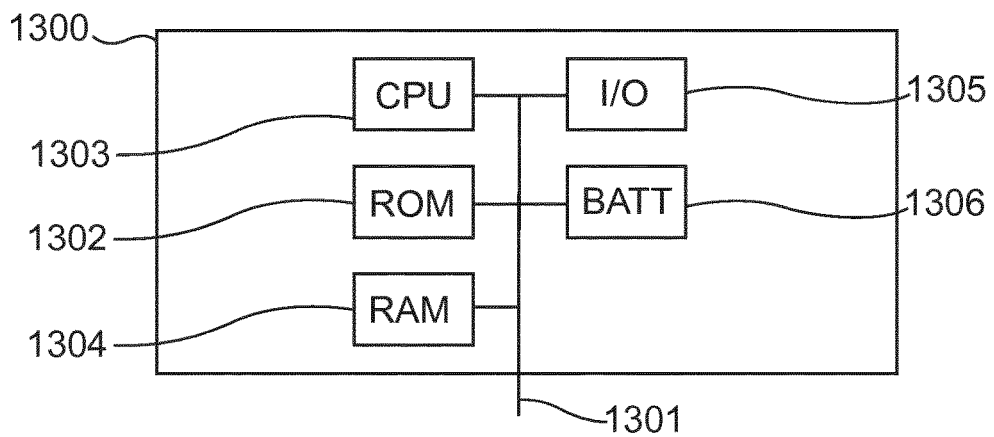
Fig. 10
Fig. 13

METHOD AND APPARATUS FOR ENCODING AND DECODING A LIGHT FIELD BASED IMAGE, AND CORRESPONDING COMPUTER PROGRAM PRODUCT

This application claims the benefit of International Application PCT/EP2016/071717, under 35 U.S.C. § 365, filed on Sep. 14, 2016, which was published in accordance with Article 21(2) on Mar. 23, 2017, in English, and which claims the benefit of European Patent Application No. 15306409.2, filed on Sep. 14, 2015.

1. FIELD OF THE INVENTION

The present disclosure relates to light field imaging, and to technologies for acquiring and processing light field data. More precisely, the present disclosure generally relates to a method and an apparatus for encoding and decoding a light field based image, and finds applications in the domain of image or video encoding/decoding.

2. TECHNICAL BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capture devices render a three-dimensional scene onto a two-dimensional sensor. During operation, a conventional capture device captures a two-dimensional (2-D) image representing an amount of light that reaches a photosensor (or photodetector) within the device. However, this 2-D image contains no information about the directional distribution of the light rays that reach the photosensor (which may be referred to as the light field). Depth, for example, is lost during the acquisition. Thus, a conventional capture device does not store most of the information about the light distribution from the scene.

Light field capture devices (also referred to as "light field data acquisition devices") have been designed to measure a four-dimensional (4D) light field of the scene by capturing the light from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light field capture device is referred to as the light field data. Light field capture devices are defined herein as any devices that are capable of capturing light field data. There are several types of light field capture devices, among which:
- plenoptic devices, which use a microlens array placed between the image sensor and the main lens, as described in document US 2013/0222633;
- a camera array, where all cameras image onto a single shared image sensor.

The light field data may also be simulated with Computer Generated Imagery (CGI), from a series of 2-D images of a scene each taken from a different viewpoint by the use of a conventional handheld camera.

Light field data processing comprises notably, but is not limited to, generating refocused images of a scene, generating perspective views of a scene, generating depth maps of a scene, generating extended depth of field (EDOF) images, generating stereoscopic images, and/or any combination of these.

The present disclosure focuses more precisely on light field based image captured by a plenoptic device as illustrated by FIG. 1 disclosed by R. Ng, et al. in "*Light field photography with a hand-held plenoptic camera*" Standford University Computer Science Technical Report CSTR 2005-02, no. 11 (April 2005).

Such plenoptic device is composed of a main lens (11), a micro-lens array (12) and a photo-sensor (13). More precisely, the men lens focuses the subject onto (or near) the micro-lens array. The micro-lens array (12) separates the converging rays into an image on the photo-sensor (13) behind it.

A micro-image is the image (14) formed on the photo-sensor behind a considered micro-lens of the micro-lens array (12) as illustrated by FIG. 2 disclosed by http://www.tgeorgiev.net/ where the image on the left corresponds to raw data and the image on the right corresponds to details of micro-images representing in particular a seagull's head. Micro-images resolution and number depend on micro-lenses size with respect to the sensor. More precisely, the micro-image resolution varies significantly depending on devices and applications (from 2×2 pixels up to around 100×100 pixels).

Then, from every micro-image, sub-aperture images are reconstructed. Such a reconstruction consists in gathering collocated pixels from every micro-image. The more numerous the micro-lenses, the higher the resolution of sub-aperture images. More precisely, as illustrated by FIG. 3, considering that one micro-lens overlaps N×N pixels of the photo-sensor (15), the N×N matrix of views (17) is obtained by considering that the $i^{th}$ view contains all the L×L $i^{th}$ pixels overlapped by each micro-lens of the micro-lens array (16) comprising L×L micro-lenses, where "×" is a multiplication operator.

More precisely, on FIG. 3, L=8 and N=4, the first view 300 will thus comprises the first of the sixteen pixels covered by each micro-lens of the 64 micro-lenses of the considered micro-lens array.

Sub-aperture images reconstruction required de-mozaicing. Techniques for recovering the matrix of views from raw plenoptic material are currently developed such as the one disclosed by N. Sabater et al. in "*Light field demultiplexing and disparity estimation*" International Conference on Complementary Problems ICCP 2014.

On the opposite to the plenoptic device, camera array devices, such as the Pelican Imaging® camera, deliver directly matrices of views (i.e. without de-mozaicing).

State of Art methods for encoding such light field based images consists in using standard image or video codecs (such as JPEG, JPEG-2000, MPEG4 Part 10 AVC, HEVC). However, such standard codecs are not able to take into account the specificities of light field imaging (aka plenoptic data), which records the amount of light (the "radiance") at every point in space, in every direction.

Indeed, applying the conventional standard image or video codecs (such as JPEG, JPEG-2000, MPEG4 Part 10 AVC, HEVC) delivers conventional imaging formats.

However, among the many new light field imaging functionalities provided by these richer sources of data, is the ability to manipulate the content after it has been captured; these manipulations may have different purposes, notably artistic, task-based and forensic. For instance, it would be possible for users to change, in real time, focus, field of depth and stereo baseline, as well as the viewer perspective. Such media interactions and experiences are not available with conventional imaging formats that would be obtained by using the conventional standard image or video codecs to encode/decode light field based images.

It would hence be desirable to provide a technique for encoding/decoding light field based images that would not show these drawbacks of the prior art. Notably, it would be desirable to provide such a technique, which would allow a finer rendering of objects of interest of decoded images obtained from light field based images.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for predicting at least one block of pixels of a view belonging to a matrix of views obtained from light-field data associated with a scene.

Such method is implemented by a processor and comprises for at least one pixel to predict of said block of pixels:
   from said matrix of views, obtaining at least one epipolar plane image (EPI) to which said at least one pixel to predict belongs,
   among a set of unidirectional prediction modes, determining at least one optimal unidirectional prediction mode from a set of previous reconstructed pixels neighboring said at least one pixel to predict in said at least one epipolar plane image,
   extrapolating a prediction value of said at least one pixel to predict by using said at least one optimal unidirectional prediction mode.

The present disclosure thus relies on a novel and inventive approach for predicting at least one block of pixels of a view belonging to a matrix of views obtained from light-field data associated with a scene. Actually, the present disclosure benefits from the specific properties of the linear structures inside an epipolar plane image.

More precisely, and as disclosed by B. Goldluecke et al. in "*The Variational Structure of Disparity and Regularization of 4D Light Fields*" pp 1003-1010 2013 IEEE Conference on Computer Vision and Pattern Recognition, a horizontal (respectively a vertical) epipolar plane image is a 2D image, built by stacking all images of a matrix of views along a line (respectively a column) of views of said matrix of view, on top of each other, and corresponds to a cut through the obtained stack along a same line of each stacked view (respectively along a same column of each stacked view).

It has to be noted that another orientation different from horizontal or vertical can be used for obtaining the corresponding EPI.

In other words, according to present disclosure, said at least one epipolar plane image (EPI) is a horizontal epipolar plane image (EPI), a vertical epipolar plane image (EPI) or an epipolar plane image (EPI) presenting an angular orientation with respect to a horizontal or vertical epipolar plane image (said angular orientation being predetermined or not).

Determining at least one optimal unidirectional prediction mode, among a set of unidirectional prediction modes (predetermined or not), from a set of previous reconstructed pixels neighbouring said at least one pixel to predict in said at least one epipolar plane image, permits to take advantage of the inter-views correlations accurately, i.e. with a pixel (or a group of pixels smaller than a block of pixels) resolution, which is not possible according to the predicting methods of the prior art such as the one of the H.264 standard.

As a consequence, thanks to the predicting mode of the present disclosure based on the Epipolar Plane images, it is possible to provide a prediction mode, which is more optimal with respect to the specificities of plenoptic imaging providing matrix of views.

It has to be noted that B. Goldluecke in "*The Variational Structure of Disparity and Regularization of 4D Light Fields*" neither discloses nor suggests to use epipolar plane images for optimizing the prediction of pixels during an encoding/decoding process, but use epipolar plane images for deriving differential constraints on a vector field on epipolar plane image space to enable consistent disparity field related to the regularization of more general vector-valued functions on the 4D ray space of the light field.

Using epipolar plane images permits to exploit the properties of the four-dimensional (4D) light field of the scene, since their building is based on the stacking of views representing the light from different viewpoints of that scene, i.e. viewpoints of a same line of the matrix of views for a horizontal epipolar plane image, of a same column of the matrix of views for a vertical epipolar plane image, or of a same set of views of said matrix of views presenting an angular orientation with respect to a line or a column of said matrix of views.

According to a first embodiment of the present disclosure, said determining said optimal unidirectional prediction mode comprises, for at least one pixel to predict of said block of pixels:
   associating a different filtering operation to each unidirectional prediction mode of said set of unidirectional prediction modes,
   applying each filtering operation to said set of previous reconstructed pixels neighbouring said at least one pixel to predict in said at least one epipolar plane image, to obtain an energy level for each unidirectional prediction mode,
   selecting said optimal unidirectional prediction mode corresponding to the unidirectional prediction mode of which the energy level is the argument of the minimum, or of the maximum of energy levels obtained for each unidirectional prediction mode.

In other words, each unidirectional prediction mode is associated with a direction of extrapolation of the prediction value of said at least one pixel to predict from a set of previous reconstructed pixels neighbouring said at least one pixel to predict in said at least one epipolar plane image.

Indeed, light field is defined on ray space, and implicitly represents scene geometry data in a rich structure, which becomes visible on its epipolar plane images. Thus, epipolar plane images present specific directional structures. According to the present disclosure, the selected optimal unidirectional prediction mode corresponds to the unidirectional prediction mode, which is the most adapted with respect to the directional structure of the considered epipolar plane image used for the pixel to predict of the considered block of pixels.

According to a second embodiment, the method for predicting of the present disclosure further comprises providing at least one group of pixels to predict within said block of pixels, said group of pixels comprising at least two pixels of a same line, of a same column, or of a set of at least two pixels presenting an angular orientation with respect to a line or a column of said block of pixels, wherein determining said optimal unidirectional prediction mode comprises:

associating a different filtering operation with each unidirectional prediction mode of said set of unidirectional prediction modes, for at least one pixel to predict of said group of pixels, applying each filtering operation to said set of previous reconstructed pixels neighbouring said at least one pixel to predict in said at least one epipolar plane image, to obtain an energy level for each unidirectional prediction mode, selecting a same optimal unidirectional prediction mode for all pixels to predict belonging to said group of pixels, said optimal unidirectional prediction mode corresponding to the unidirectional prediction mode of which the energy level is the argument of the minimum, or of the maximum, of energy levels obtained for at least one pixel to predict of said group of pixels.

According to such an embodiment, the implemented selection is robust since a single optimal unidirectional prediction mode is obtained for all pixels to predict belonging to said group, such optimal unidirectional prediction mode presenting the energy level, which is the argument of the minimum of energy levels obtained for each unidirectional prediction mode and for at least one pixel to predict of said group of pixels.

It can be noticed that an approach based on maximum gradients with gradients calculated according to directions orthogonal to the potential contours is also possible.

In other words, the selection is done by taking into account more obtained energy levels than the ones taken into account in the previous embodiment, where the selection of the optimal unidirectional prediction mode is performed so that an optimal unidirectional prediction mode is obtained per pixel to predict and not for all pixels to predict belonging to said group of pixels.

According to a first variant of the two preceding embodiments, when at least two epipolar plane images (EPI) to which one pixel to predict belongs, corresponding, to a horizontal epipolar plane image (EPI) and a vertical epipolar plane image (EPI), or to a set of different angular orientations epipolar plane images (EPI), determining said optimal unidirectional prediction mode is performed for said horizontal epipolar plane image (EPI) and for said vertical epipolar plane image (EPI), or for a set of different angular orientations epipolar plane images (EPI), said optimal unidirectional prediction mode corresponding to the unidirectional prediction mode of which the energy level is the argument of the minimum of energy levels obtained for each epipolar plane image.

According to a second variant of the two preceding embodiments, when at least two epipolar plane images (EPI) to which one pixel to predict belongs, corresponding to a horizontal epipolar plane image (EPI) and a vertical epipolar plane image (EPI), or to a set of different angular orientations epipolar plane images (EPI), an optimal unidirectional prediction mode is determined for each epipolar plane image and said prediction value of said at least one pixel to predict corresponds to a mean of at least two prediction values obtained respectively by using said optimal unidirectional prediction mode determined for each epipolar plane image.

According to another aspect of the previous embodiments, associating a different filtering operation with each unidirectional prediction mode of said set of unidirectional prediction modes, comprises, for each different filtering operation, locating an application point among said set of previous reconstructed pixels neighbouring said at least one pixel to predict in said at least one epipolar plane image.

Such an aspect increase the accuracy of the following step of applying each filtering operation to said set of previous reconstructed pixels neighbouring said pixel to predict in said at least one epipolar plane image, to obtain an energy level for each unidirectional prediction mode.

According to another aspect of the previous embodiments, when among said set of previous reconstructed pixels neighbouring said pixel to predict in said at least one epipolar plane image, at least one reconstructed pixel belongs also to said view and is adjacent to said pixel to predict, one of the unidirectional prediction modes corresponds to the unidirectional prediction mode of which the extrapolating direction is the direction from said at least one reconstructed pixel, belonging both to said at least one epipolar plane image and to said view, to said pixel to predict.

The invention also relates to a method for encoding at least one block of pixels of a view belonging to a matrix of views obtained from light-field data associated with a scene.

Such method is implemented by a processor and comprises:

predicting said at least one block of pixels according to the method for predicting as disclosed above to obtain a predicted block of pixels, determining a residual error corresponding to the difference between said at least one block of pixels and said predicted block of pixels, encoding said residual error associated with said block of pixels.

The prediction implemented during said encoding could of course comprise the different features of the predicting method according to the different embodiments or variants of the present disclosure as previously described.

According to a particular aspect of said method for encoding, said method for encoding further comprises:

inserting the encoded residual error in a signal representing said matrix of views obtained from light-field data associated with said scene, inserting in said signal information representing at least one group of pixels to predict within said block of pixels.

Another aspect of the present disclosure pertains to a signal representing at least one block of pixels of a matrix of views obtained from light-field data associated with said scene, said signal being obtained by said method for encoding as described above wherein information representing at least one group of pixels to predict within said block of pixels is inserted in said signal.

Another aspect of the present disclosure concerns a recording medium bearing a signal as described above.

Another aspect of the present disclosure pertains to a method for decoding a signal representing at least one block of pixels of a view belonging to a matrix of views obtained from light-field data associated with a scene.

Such method is implemented by a processor and comprises:

from said signal, decoding a residual error associated to said block of pixels, predicting said at least one block of pixels according to the method for predicting as disclosed above to obtain a predicted block of pixels, reconstructing said at least one block of pixels by adding said residual error to said predicted block of pixels.

Such a method for decoding is especially suited to decode a signal encoded according to the above-described encoding method.

In this way, the same prediction steps are performed as those performed when encoding so as to rebuilt the given block of pixels, and by optionally adding the prediction residue (transmitted in the signal) to the prediction.

In particular aspect of said method for decoding, it is possible to extract, from said signal, information representing at least one group of pixels to predict within said block of pixels, said predicting taking into account said information.

Another aspect of the present disclosure pertains to a device for encoding at least one block of pixels of a view belonging to a matrix of views obtained from light-field data associated with a scene, wherein said device comprises a processor configured to control:

a module for predicting said at least one block of pixels to obtain a predicted block of pixels, said module comprising, for at least one pixel to predict of said block of pixels:
an entity for obtaining, from said matrix of views, at least one epipolar plane image (EPI) to whichsaid pixel to predict belongs,
an entity for determining, among a set of unidirectional prediction modes, at least one optimal unidirectional prediction mode from a set of previous reconstructed pixels neighbouring said pixel to predict in said at least one epipolar plane image,
an entity for extrapolating a prediction value of said pixel to predict by using said at least one optimal unidirectional prediction mode,
a module for determining a residual error corresponding to the difference between said at least one block of pixels and said predicted block of pixels,
a module for encoding said residual error associated with said block of pixels.

Such an encoding device is adapted especially for implementing the method for encoding as described here above.

Another aspect of the present disclosure pertains to a device for decoding a signal representing at least one block of pixels of a view belonging to a matrix of views obtained from light-field data associated with a scene, wherein said device comprises a processor configured to control:

a module for decoding a residual error associated to said block of pixels,
a module for predicting said at least one block of pixels to obtain a predicted block of pixels, said module comprising, for at least one pixel to predict of said block of pixels:
an entity for obtaining, from said matrix of views, at least one epipolar plane image (EPI) to which said pixel to predict belongs,
an entity for determining, among a set of unidirectional prediction modes, at least one optimal unidirectional prediction mode from a set of previous reconstructed pixels neighbouring said pixel to predict in said at least one epipolar plane image,
an entity for extrapolating a prediction value of said pixel to predict by using said at least one optimal unidirectional prediction mode,
a module for reconstructing said at least one block of pixels by adding said residual error to said predicted block of pixels.

Such a decoding device is adapted especially for implementing the method for decoding as described here above.

The disclosure relates thus to devices comprising a processor configured to implement the above methods.

According to other of its aspects, the disclosure relates to a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present disclosure is illustrated. It shows:

FIG. 1, already presented in relation with prior art, shows the conceptual schematic of a plenoptic camera;

FIG. 2, already presented in relation with prior art, shows an example of picture shot with a plenoptic camera;

FIG. 3 already presented in relation with prior art, shows respectively a camera sensor (15), et micro-lens array (16) and a matrix of views (17);

FIGS. 6a and 6b show schematically a diagram of the sub-steps of the determining of an optimal unidirectional prediction mode in accordance with two embodiments of the disclosure;

FIGS. 7a and 7b show respectively the prediction neighbouring of a pixel to predict in the given view and then in the considered epipolar plane image;

FIG. 8 shows an example of a set of predetermined unidirectional prediction modes;

FIG. 9 shows an example of filtering operations respectively associated with the set of predetermined unidirectional prediction modes of FIG. 8;

FIG. 10 illustrates the locating of an application point of one filtering operation of FIG. 9;

FIG. 13 shows an example of architecture of a device in accordance with an embodiment of the disclosure.

Similar or same elements are referenced with the same reference numbers.

Figure 1:
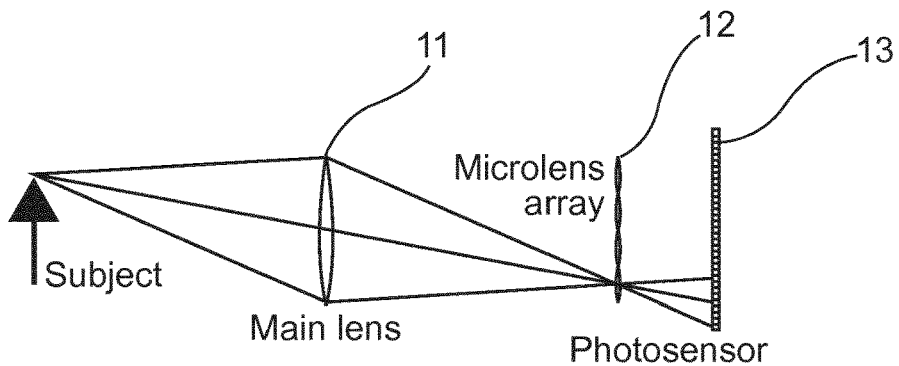
Figure 2:
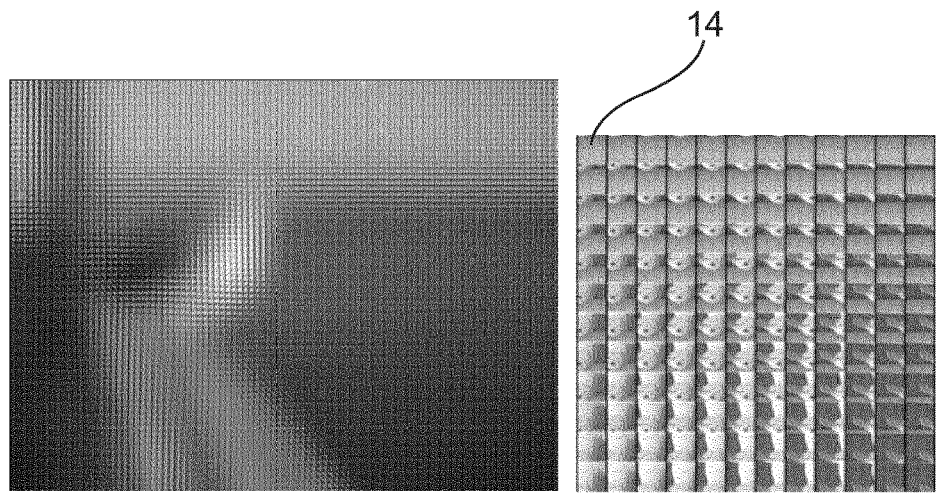

5. DESCRIPTION OF EMBODIMENTS 5.1 General Principle

The present disclosure proposes a new technique for encoding (or decoding) an image of matrix of views implementing a new type of prediction based on the Epipolar Plane Images (EPI) representation of a matrix of views.

More precisely, from the causal reconstructed pixels of Epipolar Plane Images (EPI) neighbouring a current pixel to predict and to encode, the best direction among unidirectional prediction modes is found, and subsequently used to extrapolate the prediction value of said current pixel to predict and to encode.

The approach proposed in the present disclosure is thus able to cope with the specific properties of the linear structures inside the Epipolar Plane Images (EPI) and as a consequence suitable for exploiting the properties of the four-dimensional (4D) light field of the scene.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding a block of pixels of a view of a matrix of views but extends to the encoding/decoding of a sequence of matrix of views (plenoptic video) because each view of each matrix of views belonging to said sequence is sequentially encoded/decoded as described below.

5.2 The Prediction Method

Figure 5:
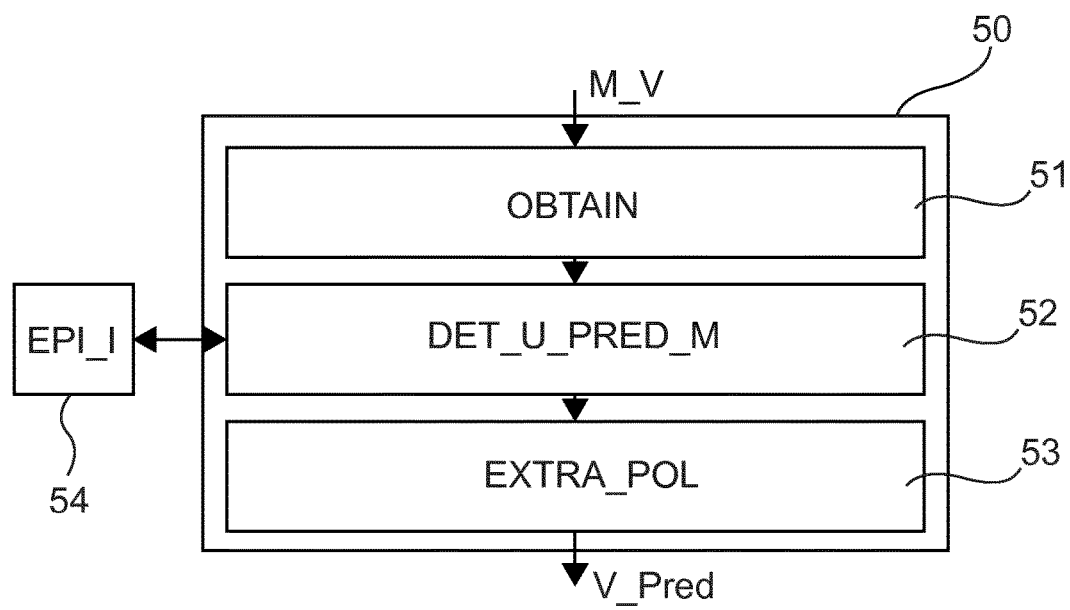
FIG. 5 shows schematically a diagram of the main steps of the method for predicting according to the present disclosure.

FIG. 5 shows schematically a diagram of the main steps of the method (50) for predicting according to the present disclosure, said method being performed by a module for predicting.

Figure 3:
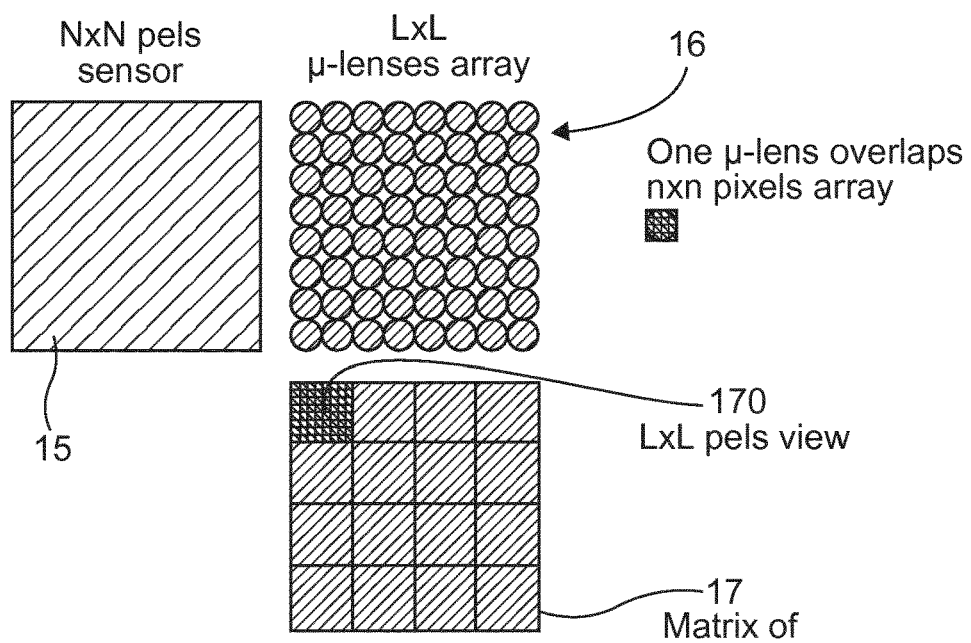

According to the present disclosure, the method (50) for predicting at least one block of pixels of a view (170) belonging to a matrix of views (17) obtained from light-field data associated with a scene, as represented on FIG. 3, is implemented by a processor and comprises, first, for at least one pixel to predict of said block of pixels, obtaining (51) at least one epipolar plane image (EPI) associated with said at least one pixel to predict by using an entity for obtaining. The at least one pixel to predict belongs to said at least one epipolar plane image (EPI).

Figure 4:
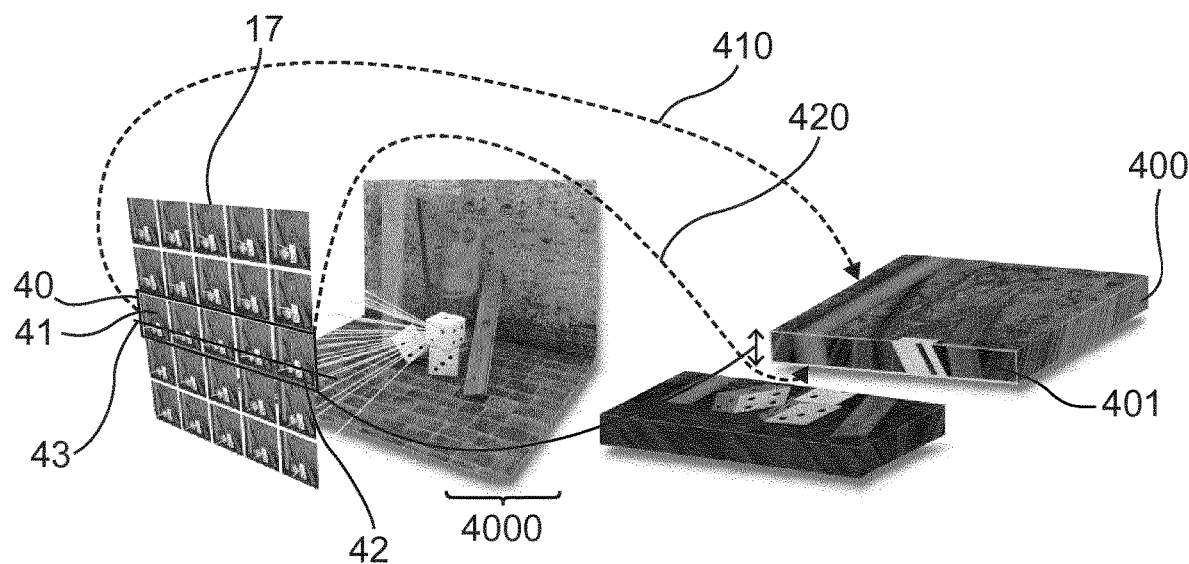
FIG. 4 shows the building of an epipolar plane image obtained from a matrix of views.

Said obtaining (51) is illustrated by FIG. 4 and disclosed by B. Goldluecke et al. in "*The Variational Structure of Disparity and Regularization of 4D Light Fields*" pp 1003-1010 2013 IEEE Conference on Computer Vision and Pattern Recognition.

The matrix of views (17) represents a 4D light field as a collection of images of a scene (4000), where the focal points of the cameras lie in a 2D plane.

Obtaining (51) an epipolar plane image consists in stacking all images along a line (40) of view points on top of each other, i.e. the first image (41) of the line (40) is on the top of the stack (400) as represented by the arrow (410), whereas the last image (42) of the line (40) is below the stack (400) as represented by the arrow (420). Then, a cut (401) through this stack (400) is performed along the same line (43) of each view. Such a cut is a horizontal epipolar plane image (EPI).

In other words, considering a matrix of views composed of B×D views (in FIG. 4 B=D=5) of indexes v,u respectively in line and column, and each views of size L×C pixels, of indexes t, s respectively in line and column, the horizontal EPI, as represented on FIG. 4 $E_h^{v,t}$ with v=0, . . . , B−1 of size D×C is realized by stacking the $t^{th}$ row of all the $v^{th}$ sub-images. In other words, the epipolar plane image is a 2D image, built by stacking one over the other, the view lines (fixed t coordinate corresponding to the view line (43)) from all views along a line of the (u,v) plane of the matrix of views (17) (fixed v coordinate corresponding to the line (40)).

Similarly, the vertical EPI $E_v^{u,s}$ with u=0, ..., D−1 of size L×B is realized by stacking the $s^{th}$ column of all the $u^{th}$ sub-images.

It has to be noted that another orientation different from horizontal or vertical can be used for obtaining the corresponding EPI.

Thus, the proposed disclosure provides for at least one pixel to predict of a considered block of pixels to predict of a view of a given matrix of views at least one epipolar plane image.

Said at least one epipolar plane image (EPI) can be a horizontal epipolar plane image (EPI), a vertical epipolar plane image (EPI) or an epipolar plane image (EPI) presenting a predetermined angular orientation with respect to a horizontal or vertical epipolar plane image It has to be noted that a considered pixel to predict can belong to at least two epipolar plane images (EPI) corresponding, to a horizontal epipolar plane image (EPI) and a vertical epipolar plane image (EPI), or to a set of different angular orientations epipolar plane images (EPI).

Once at least one epipolar plane image is obtained (51) for the considered pixel to predict, the determining (52) of at least one optimal unidirectional prediction mode, among a set of predetermined unidirectional prediction modes and from a set of previous reconstructed pixels neighbouring said at least one pixel to predict in said at least one epipolar plane image (54) is performed using an entity for determining.

Two embodiments of said determining (52) are respectively illustrated in FIGS. 6*a* and 6*b*.

More precisely, according to the first embodiment as represented on FIG. 6*a*, for at least one pixel to predict of said block of pixels comprising N pixels, a selection (63) of an optimal unidirectional prediction mode is performed among a set (6000) of M predetermined unidirectional prediction modes.

In particular, according to the present disclosure, such selection is performed by taking into account a set (6001) of previous reconstructed pixels neighbouring said at least one pixel to predict in the at least one epipolar plane image to which the considered pixel to predict belongs.

The prediction neighbouring of said at least one pixel to predict in the given view, and then only in the considered epipolar plane image is illustrated respectively by FIGS. 7*a* and 7*b*.

For example, the FIG. 7*a* represents the last view (42) of the lines of views (40) of the matrix of view (17) as represented in FIG. 4.

In particular, in said view (42) of size L×C pixels, where L=6 (6 lines) and C=13 (13 columns), the block of pixels (70) is considered. Such a block (70) is for example surrounded by pixels (71), represented by triangles, which are previously reconstructed pixels of said view (42).

In addition, and advantageously according to the present disclosure, the pixels (701) of the block of pixels (70) to predict are also surrounded by pixels (7000) in a horizontal epipolar plane image, which are also previously reconstructed pixels, represented by bold points. Such epipolar plane images permits to exploit the properties of the four-dimensional (4D) light field of the scene.

As explained before regarding the obtaining (51) of an epipolar plane image, a different horizontal (respectively vertical) image is obtained for each line (respectively column) of the considered view. In other words, the pixel 702 located in the upper line of the considered block 70 belongs to the horizontal epipolar plane image $hEPI_0$, while the pixel 701 located in the last line of the considered block 70 belongs to the horizontal epipolar plane image $hEPI_3$.

According to a first variant of the present invention, for each pixels belonging to said block of pixels (70) a prediction value is extrapolated by using at least one optimal unidirectional prediction mode determined from a set of previous reconstructed pixels neighboring said pixel to predict in said at least one epipolar plane image.

Thus, according to this first variant, all the pixels to predict of the block of pixels (70) are predicted in the dimension corresponding to the epipolar plane images.

According to a second variant, a prediction value is extrapolated by using at least one optimal unidirectional prediction mode determined from a set of previous reconstructed pixels neighboring a considered pixel to predict in said at least one epipolar plane image for only a first part of the pixels belonging to said block of pixels (70).

Once prediction values are obtained, using epipolar plane images, for said first part of the pixels belonging to said block of pixels (70), said prediction values are then used to predict the other part of pixels belonging to said block of pixels (70) for which no prediction value has been yet obtained.

Said prediction of the other part of pixels belonging to said block of pixels (70) for which no prediction value has been yet obtained is performed by using classical prediction modes derived for example from the intra prediction modes of the H. 264 standard (nevertheless requiring that a side information corresponding to this intra prediction mode is transmitted to the decoder) or more simply by using a spatial interpolation (requiring less side information, since the decoder can know by default that such a spatial interpolation have to be performed once a part of the pixels to predict have been reconstructed using epipolar plane images).

More precisely, according to a spatial interpolation, the prediction value of a pixel to predict corresponds for example to the average, or a weighting, of the values of two or more pixels neighboring it directly or not, said neighboring pixels being already reconstructed (71) or belonging to said first part and being thus already associated to a prediction value.

For example, according to an horizontal (respectively vertical) spatial interpolation, the prediction value of a pixel to predict corresponds for example to the average, or a weighting, of the values of two or more pixels, already associated to a prediction value or being already reconstructed, directly neighboring it horizontally (respectively vertically).

In this case wherein spatial interpolation is performed, a prediction value can also be obtained for pixels to predict neighboring directly said block (70) of pixels (for example the pixels to predict of a line of pixels to predict located directly beneath said block (70) by using epipolar plane images so that during the following spatial interpolation a pixel to predict of said block (70) is neigbored by the number of pixels, already associated to a prediction value or being already reconstructed, required to perform the spatial interpolation.

Thus, according to this second variant, a part of the pixels to predict of the block of pixels (70) are first predicted in the dimension corresponding to the epipolar plane images, and, the other part of pixels is predicted using a spatial interpolation preformed within the view without using any epipolar plane images.

For example, according to this second variant, for the considered block (70) of pixels to predict, a prediction value for one on two pixels is obtained by using a unidirectional prediction mode determined from epipolar plane images.

Thus, one on two pixels of the block (70) of pixels are remaining to predict. For these remaining pixels to predict, the extrapolation of a prediction value by using epipolar plane images can be replaced by using for example a horizontal spatial interpolation performed by using the set of reconstructed pixels (71) of the considered view and the pixels of said block (70) of pixels for which a prediction value has been obtained by using epipolar plane images.

For some of the remaining pixels to predict of said block (70) of pixels, it is possible that no prediction value can be obtained. In this case, the pixels of the remaining pixels for which a prediction value has been obtained are then used in a following iteration to predict the remaining pixels to predict of said block (70) by using in this case a vertical interpolation and so on. FIG. 7b represents only the pixels 701 to predict of the last line of the considered block 70 surrounded by the previously reconstructed pixels (7000) in the horizontal epipolar plane image hEPI$_3$. As already explained, among such previously reconstructed pixels (7000), some reconstructed pixels 71, represented by triangles, belong to the same view in the same line as the pixels 701 to predict. It can be seen that the set (7000) of previous reconstructed pixels neighbouring the pixels to predict 701 corresponds to the zone to the left and top of the current pixels to predict.

With respect to such an environment of the pixels 701 to predict in the horizontal epipolar plane image hEPI$_3$, the present disclosure uses new unidirectional prediction modes exploiting the specific directional properties of epipolar plane images.

An example of a set of predetermined unidirectional prediction modes is illustrated by FIG. 8. Other examples using the previously reconstructed pixels in an epipolar plane image could be easily derived. As can be seen, according to all these unidirectional prediction modes, the prediction direction is illustrated by an arrow starting from the previously reconstructed pixels in an epipolar plane image, represented by bold points, to the pixels to predict.

Such examples of unidirectional prediction modes can be considered as being similar to the ones disclosed by the intra 4×4 prediction of the H. 264 standard, but it has to be well noticed that according to the present disclosure such modes are defined by using the previously reconstructed pixels in an epipolar plane image, which permits to exploit the properties of a the four-dimensional (4D) light field of the scene.

Differently, the unidirectional predictions modes used according to the intra 4×4 prediction of the H.264 standard are defined by using previously reconstructed pixels in the image to encode (i.e. in a same view), which does not permit to benefit from the whole four-dimensional (4D) light field of the scene.

In particular, it can be seen that the mode 8 of FIG. 8 is really different from the mode 8 of the intra 4×4 prediction of the H.264 standard since the start of the arrow is located among the previously reconstructed pixels in an epipolar plane image, represented by bold points to the pixels to predict and is "horizontal down left", whereas the arrow corresponding to the mode 8 of the intra 4×4 prediction of the H.264 standard does not start from previously reconstructed pixels in an epipolar plane image and is "horizontal up".

In addition, it can be seen that the mode 2 of the intra 4×4 prediction of the H. 264 is not adapted for the prediction according to the present disclosure (i.e. no DC mode 2 is implemented according to the present disclosure), which is performed in a 4D light-field context.

According to a particular aspect of the present invention, when among said set (7000) of previous reconstructed pixels neighbouring said at least one pixel to predict in said at least one epipolar plane image, at least one reconstructed pixel belongs also to said view and is adjacent to said at least one pixel to predict, as the ones 701 represented by triangles in FIG. 7b, one of the predetermined unidirectional prediction modes corresponds to the unidirectional prediction mode of which the extrapolating direction is the direction from said at least one reconstructed pixel, belonging both to said at least one epipolar plane image and to said view, to said at least one pixel to predict. Such a mode is illustrated by the mode 1 of FIG. 8.

With respect to the first embodiment of the determining (52) as represented on FIG. 6a, such determining (52) comprises associating a different filtering operation (F_0$_j$) to each unidirectional prediction mode of said set of predetermined unidirectional prediction modes.

Such different filtering operations are for example illustrated by FIG. 9. More precisely, according to the example of FIG. 9, such filtering operations are matrixes or masks, each corresponding to one unidirectional prediction modes of the set of predetermined unidirectional prediction modes of FIG. 8.

For example, in the mask D$_0$ the start of the arrow of the vertical mode 0 of FIG. 8 is represented by "−1", whereas the tip of the arrow is represented by "1".

Many other examples of masks could be used, for example to illustrate a vertical mode, i.e a vertical contour in the epipolar plane image, the following mask D$_0$ could be used:

$$D_0 = \begin{bmatrix} -1 & -2 & -1 \\ 0 & 0 & 0 \\ 1 & 2 & 1 \end{bmatrix}$$

such example highlights also a vertical contour in the epipolar plane image and use a weighting o emphasize the weight of the neighbours just above the considered pixel to predict. Other masks with a different size than a 3×3 matrix could be also used to take into account more previous reconstructed pixels neighbouring said at least one pixel to predict in said at least one epipolar plane image.

Optionally, for improving accuracy, such filtering operation is located (610) properly in the epipolar plane image so that the vertical arrow is just above the considered pixel to predict p(0,0) as represented in FIG. 10.

More precisely, as illustrated in FIG. 10, the corresponding centre positions of the convolution masks (proposed as example in FIG. 9) for the different directions to check in relation to the first pixel p(0,0) of the EPI line to predict are the following:

D$_0$ on C$_0$=p(0, −2)
D$_1$ on C$_1$=p(−2, 0)
D$_3$ on C$_3$=p(2, −2)
D$_4$ on C$_4$=p(−2, −2)
D$_5$ on C$_5$=p(−1, 2)
D$_6$ on C$_6$=p(−3, −2)
D$_7$ on C$_7$=p(1, −2)
D$_8$ on C$_8$=p(3, −2)

Once a different filtering operation is associated (61) to each unidirectional prediction mode, and optionally properly located (610), each filtering operation (i.e. mask) is applied (62) to the set 7000 of the previous reconstructed pixels neighbouring said at least one pixel to predict (701) in said at least one epipolar plane image to obtain an energy level associated with each unidirectional prediction mode.

Such energy levels correspond to spatial gradients of each direction (i.e. arrow) associated to each unidirectional prediction mode.

The step for calculating the energy level of spatial gradients is carried out on the previous reconstructed pixels neighbouring said at least one pixel to predict (701) from the 2D masks of FIG. 9 as convolution used as window moving about in this neighbourhood.

Eight filtered versions of the neighbourhood of the pixel to predict (p(0,0) in FIG. 10 where only two windows are marked out in dotted lines) are thus generated, on which will be determined the direction energy levels $E_0$ to $E_8$ that are calculated according the following expression:

$$E_d = \sum_{(k,l) \in N_d} |(Y * D_d)(k, l)| = \sum_{(k,l) \in N_d} \sum_{a=-m}^{m} \sum_{o=-n}^{n} |Y(k + a, l + o) \cdot D_d(a, o)|$$

where:
- $N_d$ is the set of positions of the centre of a same convolution mask $D_d$, defining for each convolution mask $D_d$, a filtered neighbourhood of the pixel p(0,0) to extrapolate. This neighbourhood can be centred only on a single position (k,l) for example, as illustrated by FIG. 10 the convolution mask $D_8$ is centred on the single position $C_8$=p(3, −2). Alternatively, $N_d$ could comprise more than one position, i.e. the convolution mask $D_8$ could be located on $C_{8\_1}$=p(3, −2) and then on $C_{8\_2}$=p (4, −2). In the case where $N_d$ comprises more than one position, $E_d$ should be normalized by dividing it by the number of positions of said set $N_d$.
- (k,l) corresponds to the coordinates of the centres belonging to the set $N_d$
- Y is the luminance value,
- d is the index corresponding to the different prediction directions,
- * is the convolution operator,
- (a,o) corresponds to the coordinates of each coefficients of the convolution mask $D_d$. In FIG. 9 such a mask $D_d$ comprises 3×3=9 coefficients,
- 2n+1 and 2m+1 correspond to the size of the convolution mask $D_d$, (i.e. in the examples of 3×3 filters given by the FIGS. 9 and 10 m=n=1)
- |.| corresponds to a selected standard operator, the square elevation is also possible such that:

$$E_d = \Sigma_{(k,l) \in N_d} (Y * D_d)(k,l))^2$$

and $D_d$ corresponds to Prewitt type convolution mask defined by the EPI spatial direction d, examples of which being represented in FIG. 9, in this example $N_d$ comprises only one centre position.

In other words, such application (62) of each filtering operation to said set (7000) of previous reconstructed pixels neighbouring said at least one pixel to predict p(0,0) consists in analysing the luminance signal located in the neighbouring area of the considered pixel in the epipolar plane image to which said at least one pixel to predict belongs.

For example, for the direction d=0, i.e. using the mask $D_0$ of FIG. 9 corresponding to the mode 0 of FIG. 8 centred on the pixel $C_0$(0,−2) neighbouring the current pixel p(0,0), that is line k=−2, column l=0 (the coordinates 0,0 corresponding to the pixel to predict 701 p(0,0)), the calculated value of the energy level $E_0$ is the luminance of the pixel (0,−1) minus the luminance of the pixel (0,−3).

$$E_0 = Y(0, -1) - Y(0, -3).$$

Indeed, with respect to the chosen mask $D_0$, only two coefficients are not equal to zero.

The set of values calculated for each position of said set $N_d$ associated with the convolution mask $D_d$, gives the energy $E_d$. In the case of FIG. 10 where said set $N_d$ comprises only one centre position, there are therefore nine summations for the mask $D_0$ of size (2n+1)×(2m+1)=9 with m=n=1 when all its coefficients are different from zero.

According to the example of FIG. 9 only two coefficients are different from zero, when considering the case where $N_d$ comprises a single centre $C_0$, $D_0(0, -1)=1$ and $D_0(0,1)=-1$.

Once the energy level for each unidirectional prediction mode (of index j among M prediction modes, for example in FIG. 8 M=8) is obtained (62), then the optimal unidirectional prediction mode is selected.

Such a selection (63) consists in detecting the directions having spatial gradients with lower energy levels, such energy levels being computed in a collinear manner to the potential contours as described above.

In other words the optimal unidirectional prediction mode corresponds to the unidirectional prediction mode of which the energy level is the argument of the minimum of energy levels obtained for each unidirectional prediction mode such as:

$$d_{opt} = \underset{d}{\mathrm{Argmin}}\{E_d\}$$

with d=0,3,4,5,6,7,8 (and 1 when among said set (7000) of previous reconstructed pixels neighbouring said at least one pixel to predict in said at least one epipolar plane image, at least one reconstructed pixel belongs also to said view and is adjacent to said at least one pixel to predict).

Indeed, if the contour neighbouring the at least one pixel to predict in the epipolar plane image is a vertical contour, the luminance of the pixel (0,−1) and the luminance of the pixel (0,−3) will be close, leading to a very low value of energy $E_0$.

It can be noticed that an approach based on maximum gradients with gradients calculated according to directions orthogonal to the potential contours is also possible.

With respect to the first embodiment of FIG. 6a, for at least one pixel to predict (of index i among N pixels of said block of pixels), a selection (63) of an optimal unidirectional prediction mode is performed among a set (6000) of M predetermined unidirectional prediction modes.

According to a second embodiment illustrated by FIG. 6b, the method for predicting of the present disclosure further comprises providing (60) at least one group of pixels G_Pix to predict within said block of pixels B_Pix, said group of pixels G_Pix comprising at least two pixels Pg of a same line, of a same column, or of a set of at least two pixels presenting a predetermined angular orientation with respect to a line or a column of said block of pixels.

In the following, it is considered that said group of pixels G_Pix comprises G pixels. For example, such a group of pixels G_Pix can correspond to the four pixels Pg 701 to predict of the same line as represented in FIG. 7b.

The second embodiment of FIG. 6b differs from the first embodiment of FIG. 6a by the step of selecting (6300). Indeed, according to the second embodiment, a same optimal unidirectional prediction mode is selected (6300) for all pixels to predict belonging to said group of pixels, said optimal unidirectional prediction mode corresponding to the unidirectional prediction mode of which the energy level is the argument of the minimum of energy levels obtained for at least one pixel to predict of said group of pixels.

In other words, in this second embodiment, the optimal unidirectional prediction mode is selected, for all the pixels belonging to said group of pixels G_Pix, by taking into account M×G energy levels, whereas in the first embodiment a optimal unidirectional prediction mode is selected per pixel to predict by taking into account M energy levels.

According to a first variant of these two embodiments illustrated by FIGS. 6a and 6b, when at least two epipolar plane images (EPI) to which one pixel to predict belong, corresponding, to a horizontal epipolar plane image (EPI) and a vertical epipolar plane image (EPI), or to a set of different angular orientations epipolar plane images (EPI), determining (52) said optimal unidirectional prediction mode is performed for said horizontal epipolar plane image (EPI) and for said vertical epipolar plane image (EPI), or for a set of different angular orientations epipolar plane images (EPI), said optimal unidirectional prediction mode corresponding to the unidirectional prediction mode of which the energy level is the argument of the minimum of energy levels obtained for each epipolar plane image such as:

$$d^o_{opt} = \underset{d,o}{\mathrm{Argmin}}\{E_{d,o}\}$$

with d=0,3,4,5,6,7,8 and o=vertical or horizontal EPI.

In the same case, according to a second variant of the two preceding embodiments, the optimal unidirectional prediction mode is determined (52) for each epipolar plane image and said prediction value of said at least one pixel to predict corresponds to a mean of at least two prediction values obtained respectively by using said optimal unidirectional prediction mode determined for each epipolar plane image.

Once at least one optimal unidirectional prediction mode is determined (52) according to one of the two embodiments illustrated by FIGS. 6a and 6b, a prediction value of said at least one pixel to predict is extrapolated (53) by using said at least one optimal unidirectional prediction mode. Said extrapolation is performed by an entity for extrapolating.

These extrapolations are built as following (see FIG. 8):
mode 0 (vertical): $p(x,y)=p_0=p(x, -1)$
mode 1 (horizontal): $p(x,y)=p_1=p(x-1,y)$
mode 3 (diagonal down left): $p(x,y)=p_3=(p(x, -1)+2*p(x+1,-1)+p(x+2,-1)+2)\gg 2$
mode 4 (diagonal down right): $p(x,y)=p_4=(p(x-2, -1)+2*p(x-1, -1)+p(x, -1)+2)\gg 2$
mode 5 (vertical right): $p(x,y)=p_5=(p(x-1,-1)+p(x,-1)+1)\gg 1$
mode 6 (horizontal down right): $p(x,y)=p_6=(p(x-1,-1)+2*p(x-2,-1)+p(x-3, -1)+2)\gg 2$
mode 7 (vertical left): $p(x,y)=p_7=(p(x, -1)+p(x+1,-1)+1)\gg 1$
mode 8 (horizontal down left): $p(x,y)=p_8=(p(x+1,-1)+2*p(x+2,-1)+p(x+3, -1)+2)\gg 2$.
where:

"p(x,y)" the current pixel to predict of coordinates (0,0), (1,0), (2,0) and (3,0) respectively for the four pixels 701 of FIG. 7b.

"*" corresponds to the operator multiplication

"»n" being an integer division by $2^n$.

It has to be noted that the directions of prediction according to the present disclosure are not limited to the eight directions as represented in FIG. 8. Other directions are possible with adapted masks of convolution and the associated extrapolations formulas.

Considering the first embodiment, for example, the modes 0 ($d_{opt}=0$), 3 ($d_{opt}=3$), 5 ($d_{opt}=5$) and 8 ($d_{opt}=8$) will be selected respectively for the pixels to predict of coordinates (0,0), (1,0), (2,0) and (3,0):
$p(0,0)=p_0=p(0, -1)$,
$p(1,0)=p_3=(p(1, -1)+2*p(2,-1)+p(3,-1)+2)\gg 2$
$p(2,0)=p_5=(p(1,-1)+p(2,-1)+1)\gg 1$, and
$p(3,0)=p_8=(p(4,-1)+2*p(5,-1)+p(5,-1)+2)\gg 2$.

Considering the second embodiment, for example, the single mode 5 ($d_{opt}=5$) will be selected respectively for the four pixels to predict of coordinates (0,0), (1,0), (2,0) and (3,0):
$p(0,0)=p_5=(p(-1,-1)+p(0,-1)+1)\gg 1$,
$p(1,0)=p_5=(p(0,-1)+p(1,-1)+1)\gg 1$
$p(2,0)=p_5=(p(1,-1)+p(2,-1)+1)\gg 1$, and
$p(3,0)=p_5=(p(2,-1)+p(3,-1)+1)\gg 1$.

5.3 The Encoding Method

The prediction technique as previously described can be used by a matrix of view encoder. Indeed, the present disclosure aims at providing a method for encoding (respectively decoding) an image of matrix of views and for this goal uses a new type of prediction, as disclosed above, based on the Epipolar Plane Images (EPI) representation of the matrix of views.

Such a new type of prediction based on Epipolar Plane images (EPI) is for example automatically chosen among other classical types of prediction using a Rate Distortion Optimization criterion as disclosed by T. Wiegand et al. in "*Lagrange Multiplier Selection in Hybrid Video Coder Control*" pp 542-545 vol.3 IEEE International Conference on Image processing 2001.

Figure 11:
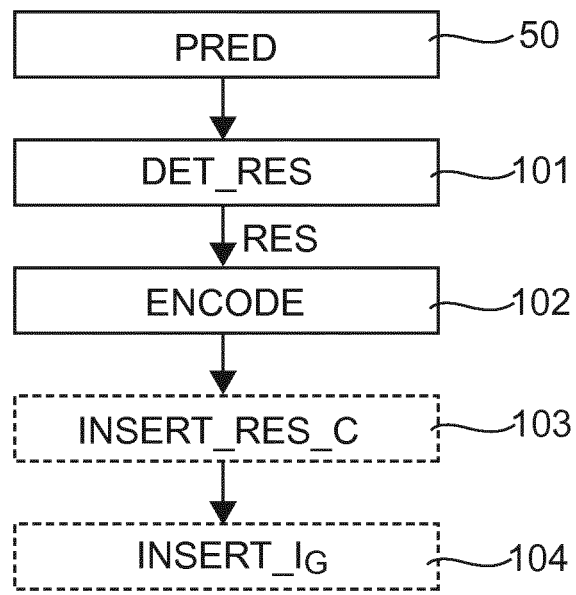
FIG. 11 shows schematically a diagram of the steps of the method for encoding according to the present disclosure.

Referring to FIG. 11, in one particular embodiment, such an encoder implements the following steps for a matrix of view obtained from light-field data associated with a scene:
  predicting (50) said at least one block of pixels according to the method for predicting as described above to obtain a predicted block of pixels,
  determining (101) a residual error corresponding to the difference between said at least one block of pixels and said predicted block of pixels, by using a module for determining,
  encoding (102) said residual error associated with said block of pixels, by using a module for encoding.

During the encoding (102) the residual error is transformed and quantized and finally entropy coded.

Optionally (as represented in dotted lines), the method for encoding further comprises:
  inserting (103) said encoded residual error in a signal representing said matrix of views obtained from light-field data associated with said scene,
  inserting (104) in said signal information representing at least one group of pixels to predict within said block of pixels.

In particular, such option is implemented when the second embodiment of the predicting method is performed. A particular signal is thus obtained comprising information representing at least one group of pixels to predict within said block of pixels.

5.4 The Decoding Method

Figure 12:
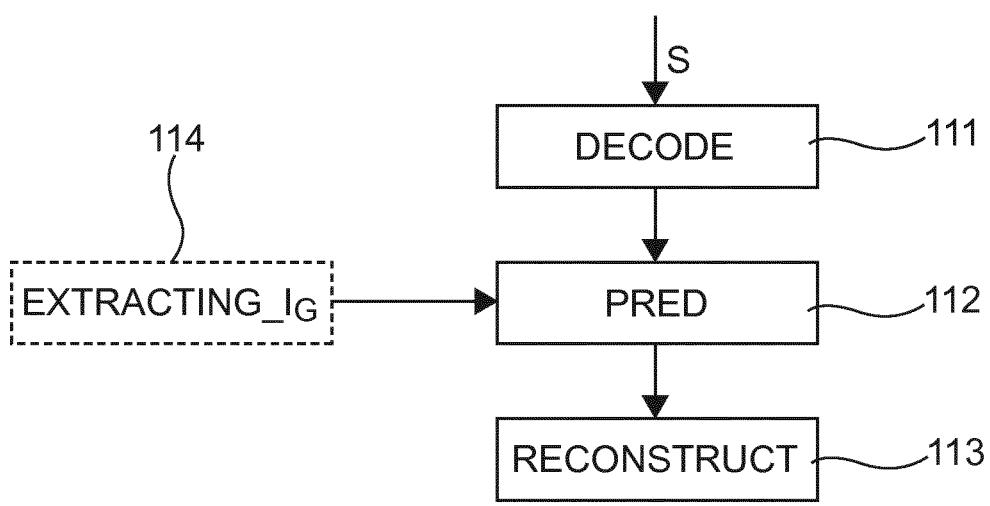
FIG. 12 shows schematically a diagram of the steps of the method for decoding according to the present disclosure.

Referring now to FIG. 12, the main steps of decoding implemented in a decoder suitable for decoding matrix of views are presented.

It is assumed that the decoder receives signal representing a matrix of views encoded for example according to the encoding method described her above.

FIG. 12 shows a decoding method in which the signal optionally (as represented in dotted lines) comprises at least one prediction residue and information representing at least one group of pixels to predict within said block of pixels.

Thus, in this embodiment, the method of decoding according to the invention comprises:
- from said signal, decoding (111) a residual error associated to said block of pixels using a module for decoding,
- predicting (112) said at least one block of pixels according to the method for predicting according to any one of claims 1 to 8 to obtain a predicted block of pixels, by using a module for predicting,
- reconstructing (113) said at least one block of pixels by adding said residual error to said predicted block of pixels, by using a module for reconstructing, and further comprises extracting (114), from said signal, information representing of at least one group of pixels to predict within said block of pixels, said predicting taking into account said information.

During the decoding (111), the residual error is dequantized and inverse transformed reciprocally to the process performed during the encoding.

5.5 Structures of the Module for Predicting, Encoder and Decoder

On FIGS. 5, 6a and 6b, 11 and 12, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 13 represents an exemplary architecture of a device 1300 which may be configured to implement a predicting method described in relation with FIG. 1-10, an encoding method in relation with FIG. 11, or a decoding method in relation with FIG. 12.

Device 1300 comprises following elements that are linked together by a data and address bus 1301:
- a microprocessor 1303 (or CPU), which is, for example, a DSP (or Digital Signal Processor);
- a ROM (or Read Only Memory) 1302;
- a RAM (or Random Access Memory) 1304;
- an I/O interface 1305 for transmission and/or reception of data, from an application; and a battery 1306.

According to a variant, the battery 1306 is external to the device. Each of these elements of FIG. 13 are well-known by those skilled in the art and won't be disclosed further. In each of mentioned memory, the word «register» used in the specification can correspond to area of small capacity (some bits) or to very large area (e.g. a whole program or large amount of received or decoded data). ROM 1302 comprises at least a program and parameters. Algorithm of the methods according to the disclosure is stored in the ROM 1302. When switched on, the CPU 1303 uploads the program in the RAM and executes the corresponding instructions.

RAM 1304 comprises, in a register, the program executed by the CPU 1303 and uploaded after switch on of the device 1300, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, said matrix of views is obtained from a source. For example, the source belongs to a set comprising:
- a local memory (1302 or 1304), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (1305), e.g. a wireline interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments of the decoding or decoder, the decoded matrix of views is sent to a destination; specifically, the destination belongs to a set comprising:
- a local memory (1302 or 1304), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (1305), e.g. a wireline interface (for example a bus interface, a wide area network interface, a local area network interface) or a wireless interface (such as a IEEE 802.11 interface or a Bluetooth® interface); and
- a display.

According to different embodiments of encoding or encoder, a bitstream delivered by said encoder is sent to a destination. As an example, said bitstream is stored in a local or remote memory, e.g. a video memory (1304) or a RAM (1304), a hard disk (1302). In a variant, said bitstreams is sent to a storage interface, e.g. an interface with a mass storage, a flash memory, ROM, an optical disc or a magnetic support and/or transmitted over a communication interface (1305), e.g. an interface to a point to point link, a communication bus, a point to multipoint link or a broadcast network.

According to different embodiments of decoding or decoder, a bitstream is obtained from a source. Exemplarily, the bitstream is read from a local memory, e.g. a video memory (1304), a RAM (1304), a ROM (1302), a flash memory (1302) or a hard disk (1302). In a variant, the bitstream is received from a storage interface, e.g. an interface with a mass storage, a RAM, a ROM, a flash memory, an optical disc or a magnetic support and/or received from a communication interface (1305), e.g. an interface to a point to point link, a bus, a point to multipoint link or a broadcast network.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method implemented by a processor and comprising: predicting at least one block of pixels of a view belonging to a matrix of views obtained from light-field data associated with a scene, wherein for at least one pixel to predict of said block of pixels:
   from said matrix of views, obtaining first and second epipolar plane images (EPI) to which said at least one pixel to predict belongs, corresponding to a horizontal epipolar plane image and a vertical epipolar plane image, or to a set of different angular orientations epipolar plane images,
   among a set of unidirectional prediction modes, determining a first unidirectional prediction mode from a first set of previous reconstructed pixels neighbouring said at least one pixel to predict in said first epipolar plane image,
   among the set of unidirectional prediction modes, determining a second unidirectional prediction mode from a second set of previous reconstructed pixels neighbouring said at least one pixel to predict in said second epipolar plane image,
   extrapolating a first prediction value of said at least one pixel to predict by using said first unidirectional prediction mode,
   extrapolating a second prediction value of said at least one pixel to predict by using said second unidirectional prediction mode, and
   determining a third prediction value of said at least one pixel to predict corresponding to a mean of the first prediction value and the second prediction value.

2. The method according to claim 1, wherein determining said first unidirectional prediction mode or said second unidirectional prediction mode comprises, for said at least one pixel to predict of said block of pixels:

associating a different filtering operation to each unidirectional prediction mode of said set of unidirectional prediction modes, applying each filtering operation to at least one of said first set of previous reconstructed pixels neighbouring said at least one pixel to predict in said first epipolar plane image for determining said first unidirectional prediction mode or to said second set of previous reconstructed pixels neighbouring said at least one pixel to predict in said second epipolar image for determining said second unidirectional prediction mode, to obtain an energy level for each unidirectional prediction mode, said filtering comprising analysing a luminance of previous reconstructed pixels neighbouring said at least one pixel to predict in said first epipolar plane image or said second epipolar plane image, and selecting said at least one of the first unidirectional prediction mode or the second unidirectional prediction mode corresponding to the unidirectional prediction mode of which the energy level is the argument of the minimum, or of the maximum, of energy levels obtained for each unidirectional prediction mode.

3. The method according to claim 2, wherein associating a different filtering operation with each unidirectional prediction mode of said set of unidirectional prediction modes, comprises, for each different filtering operation, locating an application point among said at least one of said first set of previous reconstructed pixels neighbouring said at least one pixel to predict in said first epipolar plane image or said second set of previous reconstructed pixels neighbouring said at least one pixel to predict in said second epipolar image.

4. The method according to claim 3, wherein, when among said at least one of said first set of previous reconstructed pixels neighbouring said at least one pixel to predict in said first epipolar plane image or said second set of previous reconstructed pixels neighbouring said at least one pixel to predict in said second epipolar image, at least one reconstructed pixel of the first set of reconstructed pixels belongs also to said view and is adjacent to said at least one pixel to predict in said first epipolar image or at least one reconstructed pixel of the second set of reconstructed pixels belongs also to said view and is adjacent to said at least one pixel to predict in said second epipolar image, one of the unidirectional prediction modes corresponds to the unidirectional prediction mode of which an extrapolating direction is the direction from said at least one reconstructed pixel of the first set, belonging both to said first epipolar plane image and to said view, to said at least one pixel to predict in said first epipolar image, or the extrapolating direction is the direction from said at least one reconstructed pixel of the second set, belonging both to said second epipolar plane image and to said view, to said at least one pixel to predict in said second epipolar image.

5. The method according to claim 1, further comprising providing at least one group of pixels to predict within said block of pixels, said group of pixels comprising at least two pixels of a same line, of a same column, or of a set of at least two pixels presenting an angular orientation with respect to a line or a column of said block of pixels, wherein determining at least one of said first unidirectional prediction mode or said second unidirectional prediction mode comprises:

associating a different filtering operation with each unidirectional prediction mode of said set of unidirectional prediction modes, for at least one pixel to predict of said group of pixels, applying each filtering operation to at least one of said first set of previous reconstructed pixels neighboring said pixel to predict in said first epipolar plane image for determining said first unidirectional prediction mode or to said second set of previous reconstructed pixels neighbouring said at least one pixel to predict in said second epipolar image for determining said second unidirectional prediction mode, to obtain an energy level for each unidirectional prediction mode, and selecting a same unidirectional prediction mode for all pixels to predict belonging to said group of pixels, said same unidirectional prediction mode corresponding to the unidirectional prediction mode of which the energy level is the argument of the minimum, or of the maximum, of energy levels obtained for said at least one pixel to predict of said group of pixels.

6. The method of claim 1, wherein predicting the at least one block of pixels forms a predicted block of pixels, and the method further comprising:

determining a residual error corresponding to the difference between said at least one block of pixels and said predicted block of pixels, and encoding the at least one block of pixels of the view belonging to the matrix of views obtained from light-field data associated with a scene, wherein the encoding comprises encoding said residual error associated with said block of pixels.

7. A method according to claim 6 further comprising:
inserting said encoded residual error in a signal representing said matrix of views obtained from light-field data associated with said scene, and inserting in said signal information representing at least one group of pixels to predict within said block of pixels.

8. The method of claim 1, wherein predicting the at least one block of pixels forms a predicted block of pixels, and the method further comprising:

decoding a residual error associated to said block of pixels, and decoding a signal representing at least one block of pixels of a the view belonging to the matrix of views obtained from light-field data associated with a scene, wherein the decoding of the signal comprises reconstructing said at least one block of pixels by adding said residual error to said predicted block of pixels.

9. A method for decoding according to claim 8 further comprising extracting, from said signal, information representing at least one group of pixels to predict within said block of pixels, said predicting taking into account said information.

10. A non-transitory computer readable medium, comprising instructions which when executed by a device cause said device to execute the method according to claim 1.

11. A device for encoding at least one block of pixels of a view belonging to a matrix of views obtained from light-field data associated with a scene, wherein said device comprises a processor configured to:

predict said at least one block of pixels to obtain a predicted block of pixels, wherein the processor being configured to predict said at least one block of pixels comprises, for at least one pixel to predict of said block of pixels, the processor being configured to:

from said matrix of views, obtain first and second epipolar plane images to which said at least one pixel to predict belongs, corresponding to a horizontal epipolar plane image and a vertical epipolar plane image, or to a set of different angular orientations epipolar plane images, among a set of unidirectional prediction modes, determine a first unidirectional prediction mode from a first set of previous reconstructed pixels neighbouring said at least one pixel to predict in said first epipolar plane image, among the set of unidirectional prediction modes, determine a second unidirectional prediction mode from a second set of previous reconstructed pixels neighbouring said at least one pixel to predict in said second epipolar plane image, extrapolate a first prediction value of said at least one pixel to predict by using said first unidirectional prediction mode, extrapolate a second prediction value of said at least one pixel to predict by using said second unidirectional prediction mode, and determine a third prediction value of said at least one pixel to predict corresponding to a mean of the first prediction value and the second prediction value;

determine a residual error corresponding to a difference between said at least one block of pixels and said predicted block of pixels, and encode said residual error associated with said block of pixels.

12. The device for encoding according to claim 11 wherein the processor is further configured to:
insert said encoded residual error in a signal representing said matrix of views obtained from light-field data associated with said scene, and
insert in said signal information representing at least one group of pixels to predict within said block of pixels.

13. The device according to claim 11, wherein the processor being configured to determine said first unidirectional prediction mode or said second unidirectional prediction mode comprises the processor being configured to, for said at least one pixel to predict of said block of pixels:
associate a different filtering operation to each unidirectional prediction mode of said set of unidirectional prediction modes,
apply each filtering operation to at least one of said first set of previous reconstructed pixels neighbouring said at least one pixel to predict in said first epipolar plane image to determine said first unidirectional prediction mode or to said second set of previous reconstructed pixels neighbouring said at least one pixel to predict in said second epipolar image to determine said second unidirectional prediction mode, to obtain an energy level for each unidirectional prediction mode, said filtering comprising analysing a luminance of previous reconstructed pixels neighbouring said at least one pixel to predict in said first epipolar plane image or said second epipolar plane image, and
select said at least one of the first unidirectional prediction mode or the second unidirectional prediction mode corresponding to the unidirectional prediction mode of which the energy level is the argument of the minimum, or of the maximum, of energy levels obtained for each unidirectional prediction mode.

14. The device according to claim 11, further comprising the processor being configured to provide at least one group of pixels to predict within said block of pixels, said group of pixels comprising at least two pixels of a same line, of a same column, or of a set of at least two pixels presenting an angular orientation with respect to a line or a column of said block of pixels, and wherein the processor being configured to determine said first unidirectional prediction mode or said second unidirectional prediction mode comprises the processor being configured to:
associate a different filtering operation with each unidirectional prediction mode of said set of unidirectional prediction modes,
for at least one pixel to predict of said group of pixels, apply each filtering operation to at least one of said first set of previous reconstructed pixels neighboring said pixel to predict in said first epipolar plane image to determine said first unidirectional prediction mode or to said second set of previous reconstructed pixels neighbouring said at least one pixel to predict in said second epipolar image to determine said second unidirectional prediction mode, to obtain an energy level for each unidirectional prediction mode, and
select a same unidirectional prediction mode for all pixels to predict belonging to said group of pixels, said same unidirectional prediction mode corresponding to the unidirectional prediction mode of which the energy level is the argument of the minimum, or of the maximum, of energy levels obtained for said at least one pixel to predict of said group of pixels.

15. A device for decoding a signal representing at least one block of pixels of a view belonging to a matrix of views obtained from light-field data associated with a scene, wherein said device comprises a processor configured to:
decode a residual error associated to said block of pixels,
predict said at least one block of pixels to obtain a predicted block of pixels, wherein the processor being configured to predict said at least one block of pixels comprises, for at least one pixel to predict of said block of pixels, the processor being configured to:
from said matrix of views, obtain first and second epipolar plane images to which said at least one pixel to predict belongs, corresponding to a horizontal epipolar plane image and a vertical epipolar plane image, or to a set of different angular orientations epipolar plane images,
among a set of unidirectional prediction modes, determine a first unidirectional prediction mode from a first set of previous reconstructed pixels neighbouring said at least one pixel to predict in said first epipolar plane image,
among the set of unidirectional prediction modes, determine a second unidirectional prediction mode from a second set of previous reconstructed pixels neighbouring said at least one pixel to predict in said second epipolar plane image,
extrapolate a first prediction value of said at least one pixel to predict by using said first unidirectional prediction mode,
extrapolate a second prediction value of said at least one pixel to predict by using said second unidirectional prediction mode, and
determine a third prediction value of said at least one pixel to predict corresponding to a mean of the first prediction value and the second prediction value, and
reconstruct said at least one block of pixels by adding said residual error to said predicted block of pixels.

16. The device for decoding according to claim 15, wherein the processor is further configured to extract, from said signal, information representing at least one group of pixels to predict within said block of pixels, said predicting taking into account said information.

17. The device according to claim 15, wherein the processor being configured to determine said first unidirectional prediction mode or said second unidirectional prediction mode comprises the processor being configured to, for said at least one pixel to predict of said block of pixels:
- associate a different filtering operation to each unidirectional prediction mode of said set of unidirectional prediction modes,
- apply each filtering operation to at least one of said first set of previous reconstructed pixels neighbouring said at least one pixel to predict in said first epipolar plane image to determine said first unidirectional prediction mode or to said second set of previous reconstructed pixels neighbouring said at least one pixel to predict in said second epipolar image to determine said second unidirectional prediction mode, to obtain an energy level for each unidirectional prediction mode, said filtering comprising analysing a luminance of previous reconstructed pixels neighbouring said at least one pixel to predict in said first epipolar plane image or said second epipolar plane image, and
- select said at least one of the first unidirectional prediction mode or the second unidirectional prediction mode corresponding to the unidirectional prediction mode of which the energy level is the argument of the minimum, or of the maximum, of energy levels obtained for each unidirectional prediction mode.

18. The device according to claim 15, further comprising the processor being configured to provide at least one group of pixels to predict within said block of pixels, said group of pixels comprising at least two pixels of a same line, of a same column, or of a set of at least two pixels presenting an angular orientation with respect to a line or a column of said block of pixels, and wherein the processor being configured to determine said first unidirectional prediction mode or said second unidirectional prediction mode comprises the processor being configured to:
- associate a different filtering operation with each unidirectional prediction mode of said set of unidirectional prediction modes,
- for at least one pixel to predict of said group of pixels, apply each filtering operation to at least one of said first set of previous reconstructed pixels neighboring said pixel to predict in said first epipolar plane image to determine said first unidirectional prediction mode or to said second set of previous reconstructed pixels neighbouring said at least one pixel to predict in said second epipolar image to determine said second unidirectional prediction mode, to obtain an energy level for each unidirectional prediction mode, and
- select a same unidirectional prediction mode for all pixels to predict belonging to said group of pixels, said same unidirectional prediction mode corresponding to the unidirectional prediction mode of which the energy level is the argument of the minimum, or of the maximum, of energy levels obtained for said at least one pixel to predict of said group of pixels.

19. A method implemented by a processor and comprising:
- predicting at least one block of pixels of a view belonging to a matrix of views obtained from light-field data associated with a scene, wherein for at least one pixel to predict of said block of pixels:
  - from said matrix of views, obtaining at least one epipolar plane image (EPI) to which said at least one pixel to predict belongs,
  - among a set of unidirectional prediction modes, determining at least one unidirectional prediction mode from a set of previous reconstructed pixels neighbouring said at least one pixel to predict in said at least one epipolar plane image, and
  - extrapolating a prediction value of said at least one pixel to predict by using said at least one unidirectional prediction mode,
- wherein determining said at least one unidirectional prediction mode comprises, for said at least one pixel to predict of said block of pixels:
  - associating a different filtering operation to each unidirectional prediction mode of said set of unidirectional prediction modes,
  - applying each filtering operation to said set of previous reconstructed pixels neighbouring said at least one pixel to predict in said at least one epipolar plane image, to obtain an energy level for each unidirectional prediction mode, said filtering comprising analysing a luminance of previous reconstructed pixels neighbouring said at least one pixel to predict in said at least one epipolar plane image, and
  - selecting said at least one unidirectional prediction mode corresponding to the unidirectional prediction mode of which the energy level is the argument of the minimum, or of the maximum, of energy levels obtained for each unidirectional prediction mode, and
- wherein, when the at least one pixel to predict belongs to at least first and second epipolar plane images, corresponding to a horizontal epipolar plane image and a vertical epipolar plane image, or to a set of different angular orientations epipolar plane images, said at least one unidirectional prediction mode comprises a first unidirectional prediction mode corresponding to the at least one pixel to predict belonging to the first epipolar image and a second unidirectional prediction mode corresponding to the at least one pixel to predict belonging to the second epipolar image, and said prediction value of said pixel to predict corresponds to a mean of at least a first prediction value obtained by using said first unidirectional prediction mode determined for said first epipolar plane image and a second prediction value obtained by using said second unidirectional prediction mode determined for said second epipolar plane image.

* * * * *